F. H. STONER.
JOURNAL BOX.
APPLICATION FILED MAR. 16, 1912.
1,145,090.
Patented July 6, 1915.
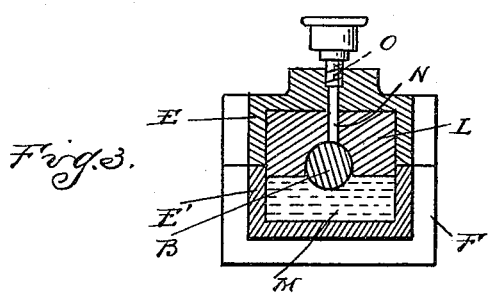
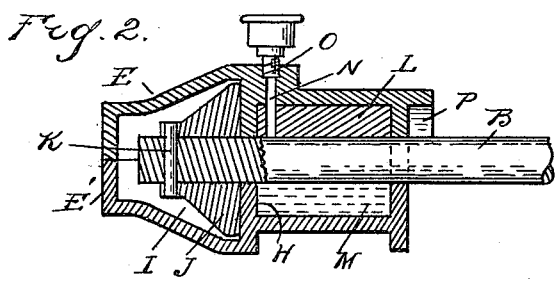
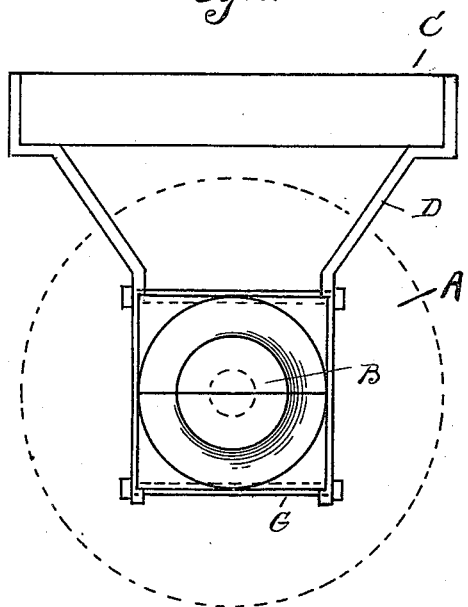
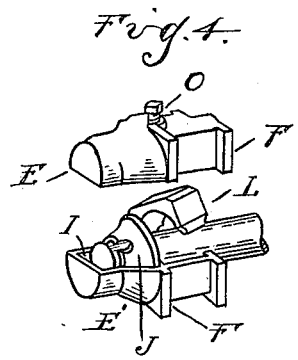
Witnesses
James P. Barry
W. K. ...
Inventor
Frank H. Stoner
By ...
attys

UNITED STATES PATENT OFFICE.

FRANK H. STONER, OF MONROE, MICHIGAN, ASSIGNOR TO WILDER-STRONG IMPLEMENT COMPANY, OF MONROE, MICHIGAN, A CORPORATION OF MICHIGAN.

JOURNAL-BOX.

1,145,090.      Specification of Letters Patent.      Patented July 6, 1915.

Application filed March 16, 1912. Serial No. 684,091.

*To all whom it may concern:*

Be it known that I, FRANK H. STONER, a citizen of the United States of America, residing at Monroe, in the county of Monroe and State of Michigan, have invented certain new and useful Improvements in Journal-Boxes, of which the following is a specification, reference being had therein to the accompanying drawings.

The invention relates to land rollers and has particular reference to the journal which supports and connects the frame with the roller shaft.

It is the object of the invention to obtain a self-lubricating bearing which is practically dust proof and to this end the invention consists in the construction as hereinafter set forth.

In the drawings,—Figure 1 is an end elevation of a land roller having my improved construction applied thereto; Fig. 2 is a longitudinal section through the bearing; Fig. 3 is a cross section thereof; Fig. 4 is a perspective view of the parts of the bearing detached.

A is the roll of any suitable construction and which is mounted upon a shaft B, C is the frame having at opposite ends thereof the depending bracket arms D which carry the journal bearing. This journal bearing comprises a two part box, the sections E, E' thereof abutting in the horizontal plane of the shaft. Each section is provided with flanges F for engaging the furcations of the bracket arm D, the latter being preferably formed of two bent bars passing upon opposite sides of the bearing. The bearing is secured by clamping bolts G extending across the bracket above and below the bearing, as shown in Fig. 1.

The sections E, E' are divided by a partition H into an inner section forming the journal proper and an outer section I for receiving the end thrust collar J which is secured to the shaft by a cotter pin K. This collar is preferably of the tapering form shown, and the box surrounding it is correspondingly tapered and forms a closed chamber which retains the oil and excludes the dust. The journal portion of the box is of rectangular form and contains the bearing block L in the upper portion thereof, while the lower portion M forms a lubricant receptacle. An oil hole N is arranged at one end of the box and is normally closed by a screw plug O so as to exclude the dirt. At the inner end of the bearing dust is excluded by a segmental flange P on the upper box section E which protects the adjacent portion of the shaft. The bearing constructed as described will require little attention and always is self lubricating.

What I claim as my invention is:

1. The combination with a shaft, of a two-part box, the sections of which abut in a horizontal plane, said sections being formed with integral partitions, dividing the box into two closed chambers, one forming a lubricant container, a journal bearing engaging the shaft within the top portion of the lubricant container, and a thrust collar secured to the shaft within the other chamber contiguous to the partition.

2. The combination with a shaft, of a two-part box, the sections of which abut in a horizontal plane, said sections being formed with integral partitions, dividing the box into two closed chambers, one of which forms a lubricant container, a journal bearing engaging the shaft within the top portion of the lubricant container, a thrust collar secured to the shaft within the other chamber contiguously to the partitions, and a dust guard with a flange upon the upper section of the box at its inner end, for protecting the shaft at its point of entrance to the box.

3. The combination with a shaft, of a two-part box, the sections of which abut in a horizontal plane, said sections being formed with integral partitions, dividing the box into an inner rectangular compartment, and an outer compartment of circular cross section, an oil container being formed by the lower portion of the rectangular compartment, a journal bearing engaging the shaft within the upper portion of the rectangular compartment, and a thrust collar secured to the shaft within the other compartment, contiguous to the partitions.

In testimony whereof I affix my signature in presence of two witnesses.

FRANK H. STONER.

Witnesses:
  MINNIE B. STONER,
  FLORENCE E. MAURER.

Copies of this patent may be obtained for five cents each, by addressing the "Commissioner of Patents, Washington, D. C."